C. J. MATTHEWS.
WATER GAGE.
APPLICATION FILED NOV. 22, 1907.
902,894.
Patented Nov. 3, 1908.
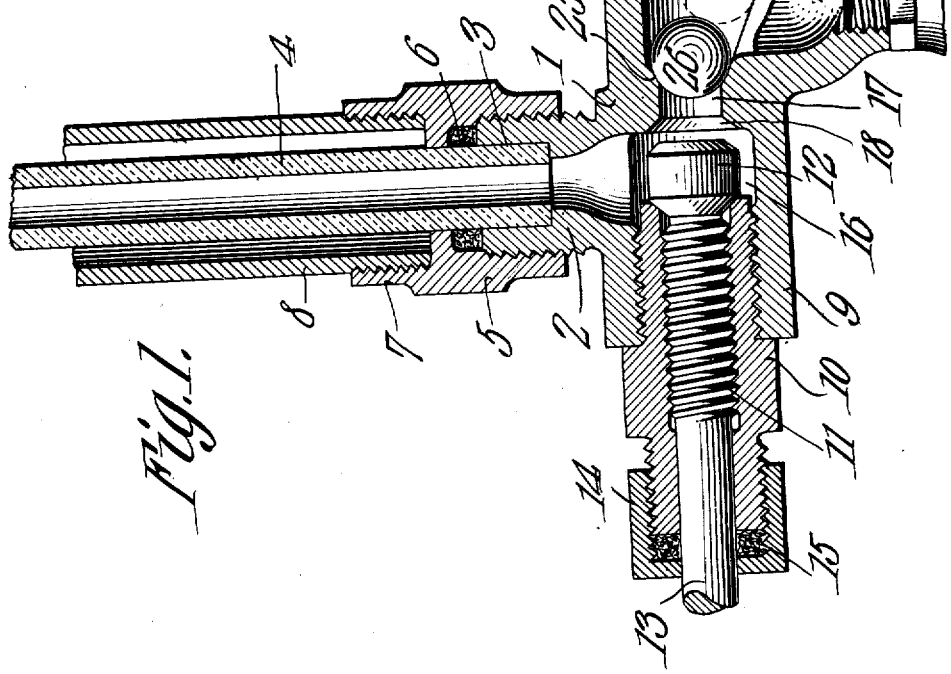
Inventor
Christopher J. Matthews.
Witnesses
By C. A. Snow & Co.
Attorneys

UNITED STATES PATENT OFFICE.

CHRISTOPHER J. MATTHEWS, OF GRAND RAPIDS, MICHIGAN.

WATER-GAGE.

No. 902,894.

Specification of Letters Patent.

Patented Nov. 3, 1908.

Application filed November 22, 1907. Serial No. 403,326.

*To all whom it may concern:*

Be it known that I, CHRISTOPHER J. MATTHEWS, a citizen of the United States, residing at Grand Rapids, in the county of Kent and State of Michigan, have invented a new and useful Water-Gage, of which the following is a specification.

This invention has reference to improvements in water gages for steam boilers or other such structures, and its object is to provide a gage in which the water and steam leads to the gage glass are automatically closed on the breakage of the gage glass, and so remain until a new glass is inserted.
The invention comprises a normally inactive valve at each end of the gage glass acting as an adjunct to the usual cut-off valve there located, so that on breaking of the gage glass, the outrush of steam or water, depending on the end of the gage structure considered, will close the valve and thus prevent a continuation of such outflow. In accordance with the present invention, each auxiliary valve normally rests at the lower end of an inclined track overhanging a chamber from which leads a blow-off pet cock, and through the track is provided a passage for the gravitation of any scale which may reach the supplemental valve, into the chamber leading to the blow-off valve. By this means, accumulations of scale which might interfere with the proper seating of the supplemental or auxiliary valve are prevented, since any deposited scale is blown out every time the gage glass is blown off. Thus, the certain seating of the auxiliary valves is assured whenever the gage glass breaks.

The invention will be best understood from the following detail description, taken in connection with the accompanying drawings forming part of this specification, in which drawings, Figure 1 is a longitudinal section of one end of the gage glass structure. Fig. 2 is a cross section through the blow-off chamber and inclined track, on a line central to the blow-off valve.

Referring to the drawings, there is shown therein but one end, the lower end, of the gage glass structure, and the following description will be limited to the showing with the understanding, however, that a similar structure is provided for the upper end of the gage glass.
The valve casing 1 is provided with a neck 2 threaded on its exterior and provided at its upper end with a counter-bore 3 designed to receive the lower end of a suitable gage glass 4. Applied to the neck 2 is a gland 5 confining packing 6 around the lower end of the gage glass immediately above the neck 2. The gland 5 is formed with an upward extension 7 having interior screw threads to receive the threaded ends of a tubular casing 8 concentric with and spaced from the gage glass and designed to protect the same from injury and also to prevent particles of glass from being scattered about should the gage glass burst. The shield 8 is provided with the usual longitudinal slot for observing the gage glass, but as this is a common structure, it is not shown in the drawings.

The forward end of the body 1 is formed with a threaded socket 9 to receive a threaded plug 10 into which is screwed a valve stem 11 terminating in a valve head 12 at one end and at the other end in a valve stem 13, which latter is surrounded by a gland 14 screwed onto the end of the plug 10 and confining packing about said stem in the usual manner.

In the casing 1 immediately below the gage glass 4 there is formed a chamber 16 housing the valve head 12 and leading from this chamber is a port 17 at the entrance of which there is a valve seat 18 for the valve 12. The port 17 leads into another chamber 19 below which the casing is formed with a hollow boss 20 closing the chamber 21. The lower end of the boss 20 is tapped for the reception of a blow-off valve 22 which may be of the usual pet-cock type. Between the chambers 19 and 21 there is an inclined track composed of two ledges 23, 23 formed on the inside walls of the casing and projecting toward each other but terminating at a sufficient distance apart to leave a longitudinal slot 24 between the contiguous edges of the track. The upper faces of the tracks are curved outwardly and upwardly. At the entrance of the port 17 into the chamber 19 there is formed another valve seat 25, so shaped as to be effectually closed by means of a ball 26 contained within the chamber 19 and normally resting at the lowest point of the tracks 23, which latter at their highest points are adjacent to the valve seat 25 and then slope downwardly and ultimately curve upward, as shown at 27, to form a retaining pocket for the ball 26 which bridges the two tracks and is constrained by these two tracks to follow a middle course along them.

The rear end of the casing 1 beyond the chamber 19 terminates in a threaded socket 28 receiving one end of a short nipple 29, the other end of which is screwed into the boiler or other structure upon which the gage is mounted. The valve structure at the upper end of the gage glass is, of course, a duplicate of the valve structure shown in Fig. 1, except that the neck 2 and the boss 20 are upon the same side of the casing 1, instead of on opposite sides, as in the lower valve structure.

Assuming that the gage glass is properly installed, the valve 12 is opened at both the top and bottom of the gage glass, and the water then flows into the gage glass in the usual manner without, however, moving with sufficient velocity under the circumstances to cause the lower ball to seat in the valve seat 25. Should the gage glass break, there is immediately an outrush of water through the lower connections and steam through the upper connections, and this sudden outrush overcomes the inertia and weight of the ball 26 in the respective connections and carries it to the valve seat 25 where it is held by the superior pressure on the boiler side. A new gage glass may now be inserted even without closing the valve 12, and after the glass is in place the leakage by the ball 26 will soon establish equilibrium of pressure and the ball will then drop from the valve seat 25 and roll down the inclined track to the lowermost portion thereof. Whatever scale may accumulate will gravitate down the inclined track and the inclined sides thereof and find its way into the chamber 21. Since it is the custom to blow off the gage glass from time to time through the valve 22, any scale which may have accumulated will be carried out with the steam or water. The chamber 21 forms a pocket for the scale sufficiently remote from the valve seat 25 and sufficiently out of the path of the ball 26 so that the scale can never interfere with the proper seating of the ball in the seat 25.

I claim:—

1. A water gage for steam boilers provided with a suitable gage glass, a chamber out of the line of the gage glass and between the same and the boiler, said chamber provided with a port leading to the gage glass and provided with a valve seat in the chamber side, an inclined track in said chamber leading in a downward direction away from the valve seat and terminating at the other or boiler end of the chamber, and a ball valve normally carried and guided to the valve seat by the track and always in the path of fluid moving from the boiler toward the gage glass.

2. A water gage for steam boilers provided with a suitable gage glass, a chamber out of the line of the gage glass and between the same and the boiler, said chamber communicating with the gage glass through a port having a valve seat on the chamber side and with the boiler through a port opposite the first-named port, a track in said chamber consisting of two inclined members having separated adjacent edges and leading from a point coincident with the lower edge of the valve seat downward and away from the same and terminating at the boiler side of the chamber adjacent to the port leading from the chamber to the boiler, a ball valve normally carried and guided to the valve seat by the track and always in the path of fluid under pressure issuing from the boiler, and a blow-off valve communicating with the chamber below the track and constituting the blow-off valve for the gage cocks.

3. A water gage for steam boilers provided with a suitable gage glass, a chamber out of the line of the gage glass between the same and the boiler, said chamber communicating with the gage glass through a port having a valve seat on the chamber side, another chamber or pocket below the first named chamber, an inclined track leading downward from the said valve seat, the said track consisting of two members spaced apart with the upper surfaces inclined upwardly and outwardly in a lateral direction, a blow-off valve leading from the pocket, and a ball valve normally carried by the track.

In testimony that I claim the foregoing as my own, I have hereto affixed my signature in the presence of two witnesses.

CHRISTOPHER J. MATTHEWS.

Witnesses:
LILLIAN D. MATTHEWS,
HENRY B. VANDERCOOK.